March 26, 1935.  J. J. DRABIN  1,995,381
LIQUID LEVEL INDICATOR
Filed April 16, 1934
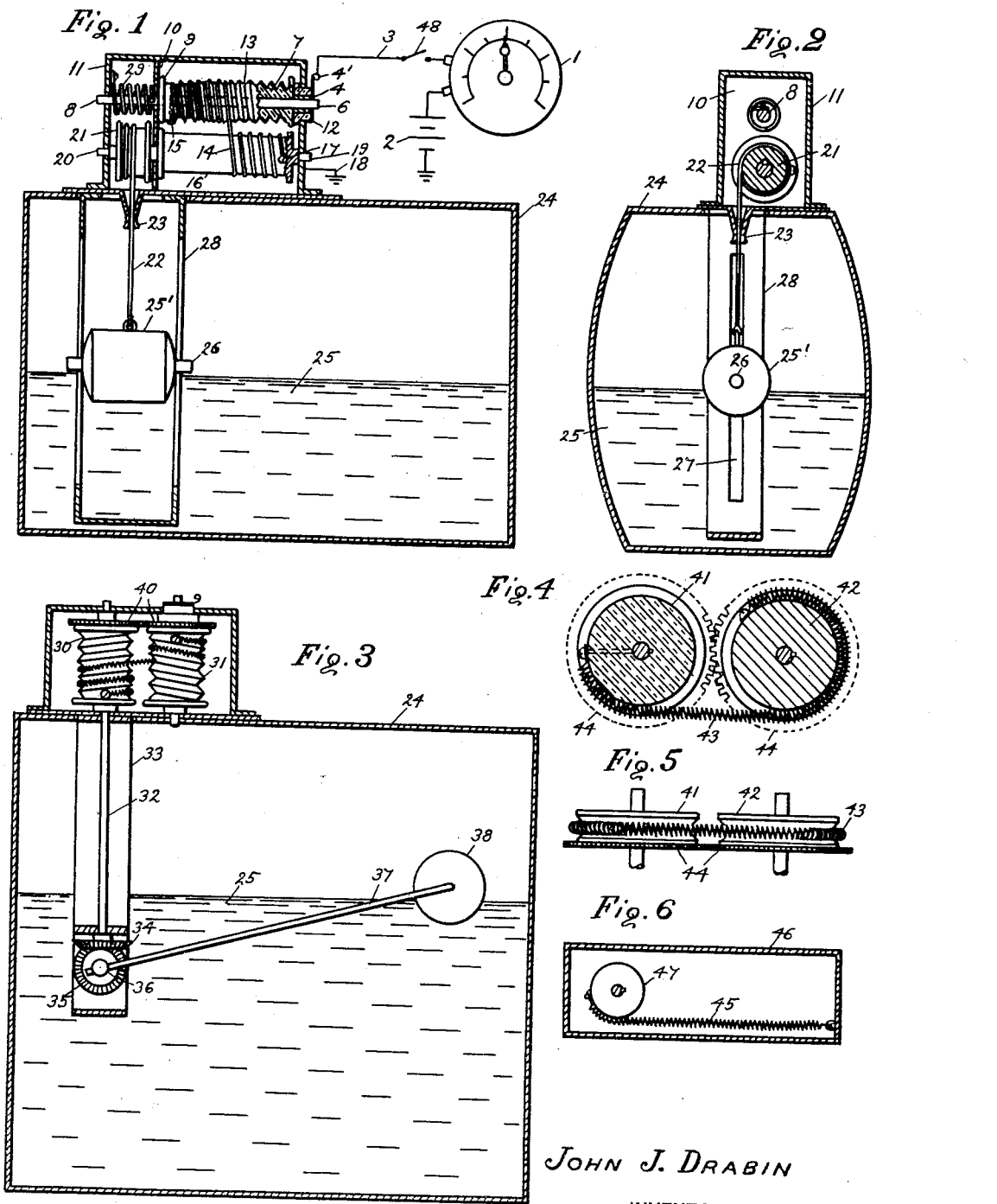
John J. Drabin
INVENTOR Patented Mar. 26, 1935

1,995,381

UNITED STATES PATENT OFFICE 1,995,381

LIQUID LEVEL INDICATOR

John J. Drabin, New York, N. Y.

Application April 16, 1934, Serial No. 720,729

2 Claims. (Cl. 201—48)

My invention relates to liquid level indicators and has particular reference to apparatus for indicating the level of a liquid in a tank, or its amount.

The object of my invention is to provide a device which can indicate or measure the amount of a liquid in a tank, the indicator itself being located at a distance from the tank, at a convenient point of observation. For this purpose I prefer to use an electric meter, calibrated in suitable units of volume (or weight), and connected with a source of electric current and a variable resistance. This resistance I provide in the form of a flexible wire wound on two cylinders which can be turned by a float in the tank. The wire is arranged so that it passes from one cylinder to the other when the cylinders are rotated. One of the cylinders is insulated, the other is made of a conducting material so that it short circuits the portion of the wire which is wound on it. With this arrangement the total resistance of the wire varies according to the length of the wire wound on the conducting cylinder. Both ends of the resistance wire being always connected with the electric circuit, there is no possibility of sparking which may be dangerous with inflammable liquids in the tank. Furthermore, I place the wire entirely outside of the tank in an enclosed space or housing.

My invention is more fully described in the accompanying specification and drawing in which—

Fig. 1 is a sectional elevation of a tank with my indicator, Fig. 2 is a transverse section of the same, Fig. 3 is a sectional elevation of a modified device, Fig. 4 is a detail view of another modification, Figs. 5 is a side view of the same, and Fig. 6 is a detail view of another modification.

My indicator consists of an electric meter 1 which may be an ordinary milliammeter calibrated in suitable units of weight or volume, for instance, in gallons. One terminal of the meter is connected with a source of electric current 2, such as a battery, and the other terminal is connected by a lead 3 with a clip 4' connected with a metal bushing 4 forming a bearing for the end of a shaft 6. The bearing is preferably made of an alloy which does not require lubrication, for instance, graphite-bronze. The shaft 6 is fastened inside of a cylinder 7 made of an insulating material such as bakelite, hard rubber, etc. Another shaft 8 is attached to a flange 9 on the other end of the cylinder 7. The shafts 6 and 8 are insulated from each other. The shaft 8 is journaled in the walls 10 and 11, the latter forming a part of a housing. The bearing bushing 4 is placed in an insulation bushing 12 supported in the wall of the housing 11. The cylinder 7 has a spiral groove 13 for a flexible resistance wire 14. One end of the wire is fastened to the cylinder 7 by a screw 15 which passes inside of the cylinder and engages the rear end of the shaft 6 thereby connecting electrically the wire with the meter 1 through the shaft 6, bushing 4 and the lead 3. The other end of the wire is partly wound on a metal cylinder 16 and is attached to it with a screw 17. The housing 11 is grounded by a lead 18, and the battery is also grounded at one end, the circuit being therefore completed through the ground. The cylinder 16 may be, of course, insulated, in which case it may be connected to the other terminal of the battery through an insulated lead (the lead 18 being directly connected with the battery).

The cylinder 16 has shafts or trunnions 19 and 20 journaled in the walls 10 and 11. A pulley 21 is mounted on the extension 20 for a flexible wire or cable 22. The cable passes through a guiding bushing 23 in the top plate of a tank 24. The bushing provides a small clearance for the cable so as to prevent the liquid 25 from the tank from passing into the space between the walls 10 and 11. The wall 10 provides an additional protection so that not only the liquid itself but even its vapors cannot penetrate into the portion of the housing 11 containing the wire 14. The latter is thereby protected against corrosive action of such vapors and, in case of inflammable liquids, the latter cannot be ignited by any accidental spark. The possibility of any sparking, however, is largely eliminated in my device, as the wire is permanently fastened with both ends to current carrying elements, and the change of its resistance is accomplished merely by short circuiting a portion of it by the metal cylinder 16. The lower end of the cable or cord 22 is attached to a float 25'. The latter is provided with lugs or pins 26 at the ends slidably fitted in slots 27 in a frame 28. The float may be made of cork or other light material, or it may be of metal, hollow inside. In a stationary tank the float may be placed in any convenient location. If the tank is mounted on a moving vehicle such as an automobile or airplane, then the frame 28 with the float must be preferably located in the geometrical center of the tank in order to minimize the effect of the inclination of the tank on the readings of the meter 1.

With the arrangement shown in Figs. 1 and 2, the float in its downward motion winds the wire on the metal cylinder 16 thereby reducing the total resistance by shortcircuiting a portion of the wire. The strongest current will be then with the empty tank. A retrieving spring 29 is attached with one end to the wall 11, and with the other end to the shaft 8. This spring becomes wound when the float moves down thereby keeping the wire tight on the cylinders. The spring becomes unwound when the float rises. The spring, turning the cylinder 7, rewinds the wire on that cylinder from the cylinder 16, thereby increasing the resistance and reducing the current.

The position of the cylinders can be reversed, of course, by connecting the insulated cylinder with the sheave 21, and attaching the spring 29 to the metal cylinder. In that case the current will be reduced when the tank is empty, and increased for a full tank.

In order to obtain equal divisions on the scale of the gauge 1 when the tank is of an oval or round cross-section, the cylinder 7 may be made of unequal thickness, or the groove 13 may be made deeper at the ends as shown in Fig. 1. The cylinder 16 can be also made larger in the middle, or it can be provided with a spiral groove of varying depth, like the cylinder 7.

A modified construction is shown in Fig. 3. Here the cylinders 30 and 31 are placed vertically, and the cylinder 30 is mounted directly on a shaft 32 journaled in a frame 33 and provided with a bevel gear 34 at the end. This gear is in mesh with another bevel gear 35 on a shaft 36 to which a rod 37 is attached with a float 38 on the end.

The cylinder 30 is made of metal, and the cylinder 31 is insulated. The wire 39 is made in the shape of a fine spiral possessing a certain resiliency so as to keep it tight on the cylinders. The cylinders are provided with gears 40 in mesh with each other, so that the cylinder 30 turns the cylinder 31 in either direction.

A modified arrangement is shown in Figs. 4 and 5. Here pulleys 41 and 42 are used instead of the spiral cylinders, and a resilient spirally wound resistance wire 43 is used. Gears 44 connect the pulleys together.

The insulated cylinder may be dispensed with as shown in Fig. 6 by attaching one end of the resistance spiral 45 to the wall of a housing 46 and permitting the spiral to stretch more or less when it becomes wound on the insulated pulley 47.

The spring 29 may be of any suitable shape, and it even may be replaced by a pulley engaged by a cord with a weight at the end.

Important advantages of my gauge are that it has no contacts subject to wear, it has no sliding contacts which might produce sparks, the resistance wire is placed in an enclosed chamber entirely separated from the tank, also that the gauge or meter can be provided with equal divisions for a round or oval tank.

A switch 48 may be placed in the lead 3 in order to disconnect the gauge when it is not needed, for instance, when the vehicle on which it is installed is standing still. This switch can be made automatic, for instance, by connecting it with an ignition switch.

I claim as my invention:

1. In a rheostat for a liquid level indicator, the combination with a housing mounted on top of a tank, of a cylinder rotatively mounted in said housing, a second cylinder rotatively mounted in said housing, a resistance wire wound on said cylinders and adapted to pass from one cylinder to the other when said cylinders are rotated, the surface of one cylinder being of an insulating material, the surface of the other cylinder being of a conducting material, a cylindrical extension on the first cylinder, a cable wound on said extension, a float in said tank attached to the free end of said cable, a retrieving spring for said second cylinder adapted to keep said resistance wire tight, and a partition in said housing separating said extension from the portions of said cylinders with the resistance wire.

2. In a rheostat for a liquid level indicator, the combination with a housing mounted on top of a tank of a cylinder journaled in the walls of said housing, a second cylinder journaled in the walls of said housing in a parallel alignment with said first cylinder, a resistance wire wound on said cylinders and adapted to pass from one cylinder to the other when said cylinders are rotated, the surface of one cylinder being of an insulating material, the surface of the other cylinder being of a conducting material, a cylindrical extension on the end of the first cylinder outside of the wall of said housing, an extension on said housing enclosing said cylinder extension, a cable wound on said cylinder extension, a float in said tank attached to the free end of said cable, and a retrieving spring for said second cylinder adapted to keep said resistance wire tight, the diameters of said cylinders varying along their length in accordance with the variations in the cross-section of said tank on different levels.

JOHN J. DRABIN.